United States Patent [19]

Durley, III et al.

[11] 4,079,944
[45] Mar. 21, 1978

[54] CUEING DEVICE FOR PHONOGRAPHS

[76] Inventors: Benton A. Durley, III, Rte. 45, Druce Lake, P.O. Box 304, Grayslake, Ill. 60030; Hari Matsuda, 611 Dempster St., Evanston, Ill. 60201

[21] Appl. No.: 637,974

[22] Filed: Dec. 5, 1975

[51] Int. Cl.² ............................................. G11B 3/10
[52] U.S. Cl. ................................................ 274/23 R
[58] Field of Search ................ 274/9 R, 9 A, 13, 14, 274/15, 23 R, 23 A; 179/100.4 A, 100.4 D, 100.3 V; 340/221, 259, 421

[56] References Cited

U.S. PATENT DOCUMENTS

| 2,615,081 | 10/1952 | Hoff | 340/259 |
| 2,952,464 | 9/1960 | Stimler | 274/23 X |
| 3,368,080 | 2/1968 | Nakagiri et al. | 274/15 X |
| 3,472,374 | 10/1969 | Ness et al. | 340/259 X |
| 3,937,903 | 2/1976 | Osann | 274/15 X |

FOREIGN PATENT DOCUMENTS

| 10,425 | 5/1969 | Japan | 179/100.4 D |

*Primary Examiner*—Charles E. Phillips
*Attorney, Agent, or Firm*—Burmeister, York, Palmatier, Hamby & Jones

[57] ABSTRACT

The cueing device, to facilitate the operation of bringing the stylus of a phonograph pickup into engagement with a selected unrecorded zone of a phonograph record, so that the next recorded zone will be played, may include a light source mounted on the pickup for providing a light beam to be reflected from the face of the record to a photoelectric device on the pickup. A utilization device, preferably including a visual signal mounted on the pickup, is operated when the reflected light beam is received by the photoelectric device from the unrecorded zones. The light source, the photoelectric device and the light path therebetween are preferably mounted in a transverse perpendicular plane, transverse to the record grooves and generally perpendicular to the record face. The light reflected by the unrecorded zones is given a polarization in a plane transverse to such transverse perpendicular plane. A polarized light transmitting device, such as means forming a slit, is preferably mounted on the pickup between the record and the photoelectric device and is oriented to favor the transmission of the light polarized by the reflection from the unrecorded zones. The slit may have its longer dimension transverse to the plane of the light path. This construction produces an increased change in the photoelectric signal when the light beam makes a transition between recorded and unrecorded zones.

23 Claims, 6 Drawing Figures

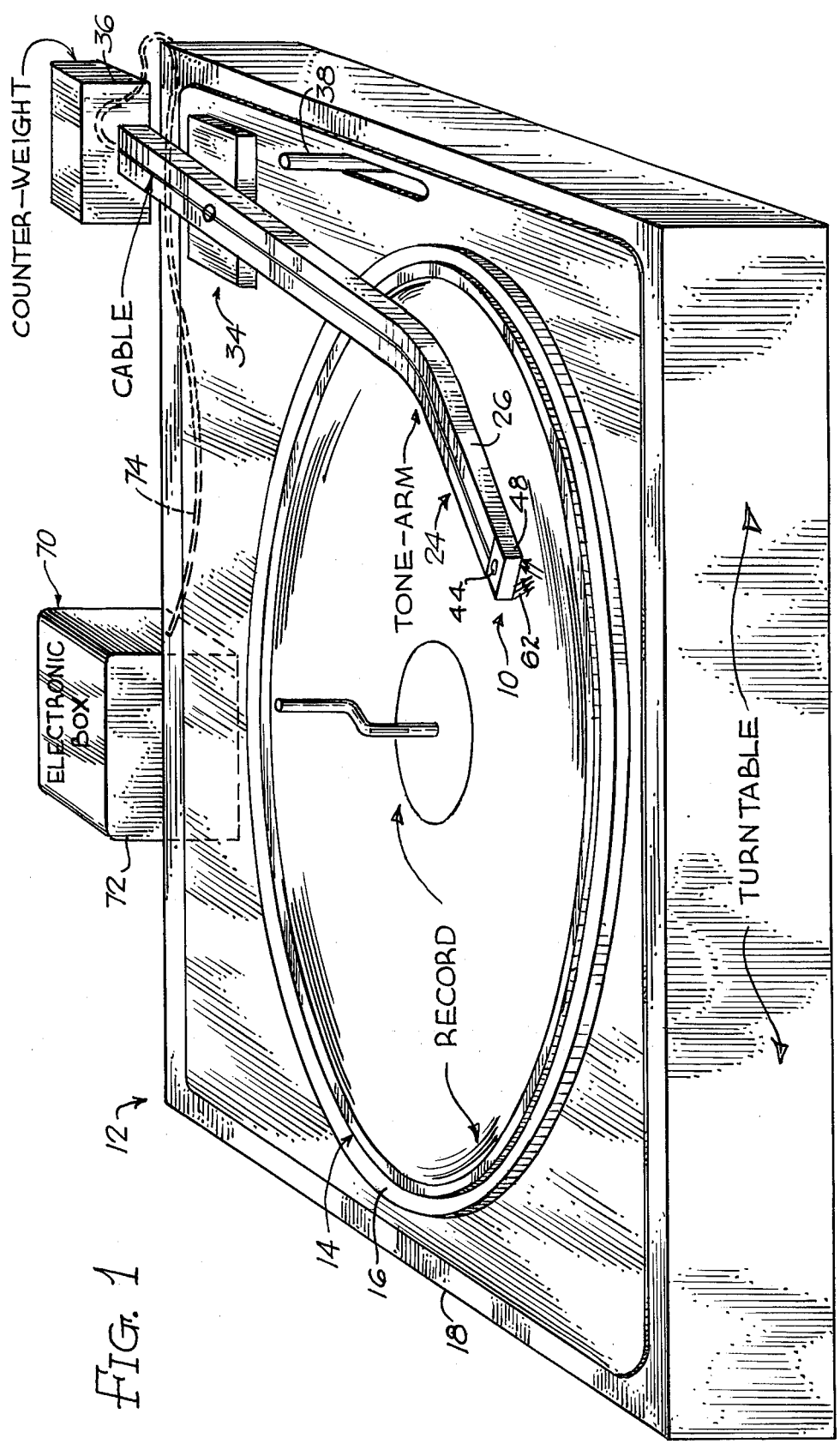

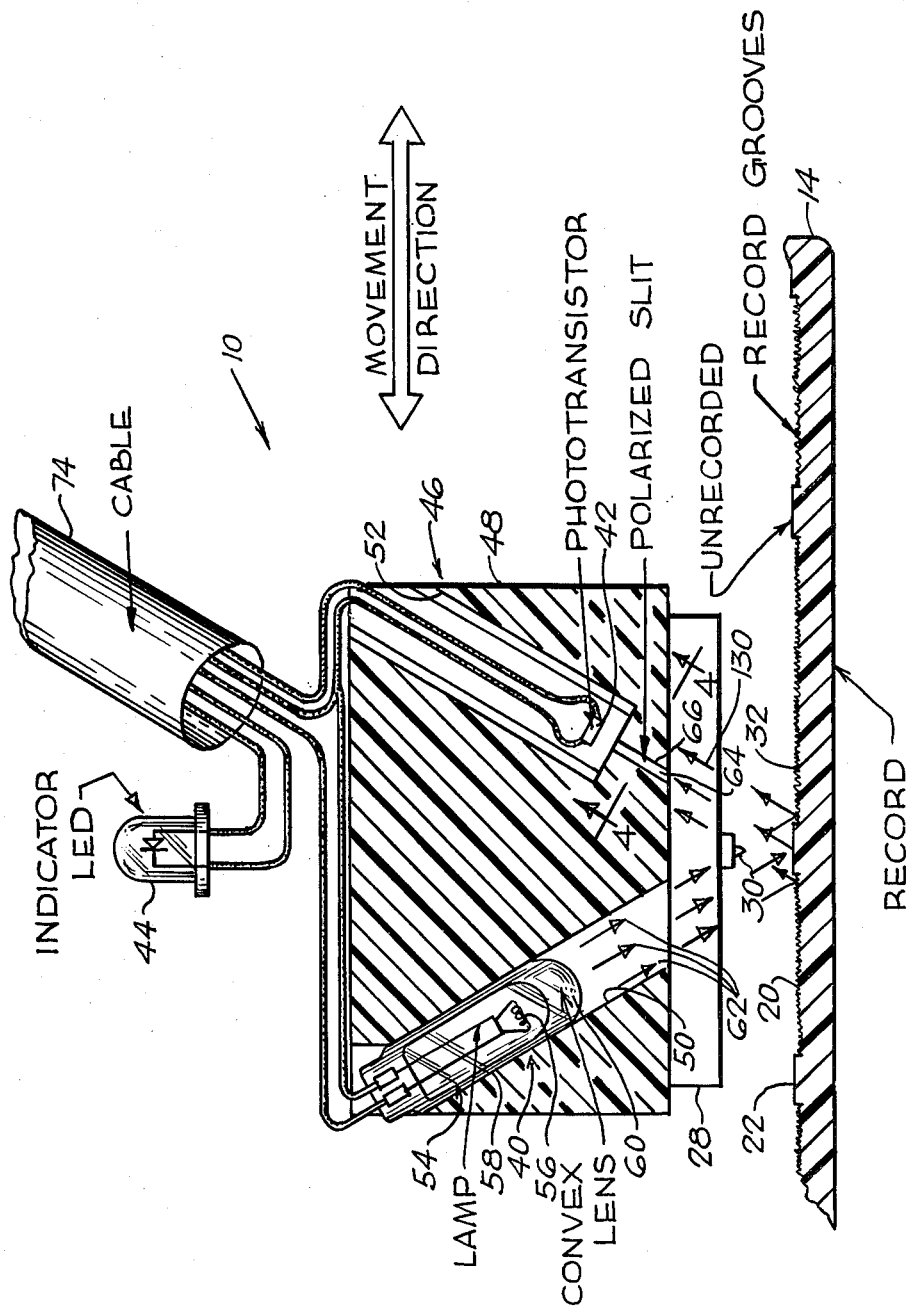
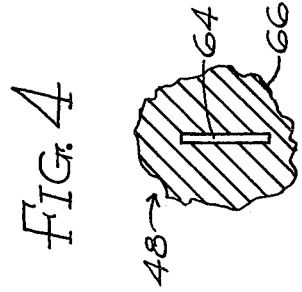

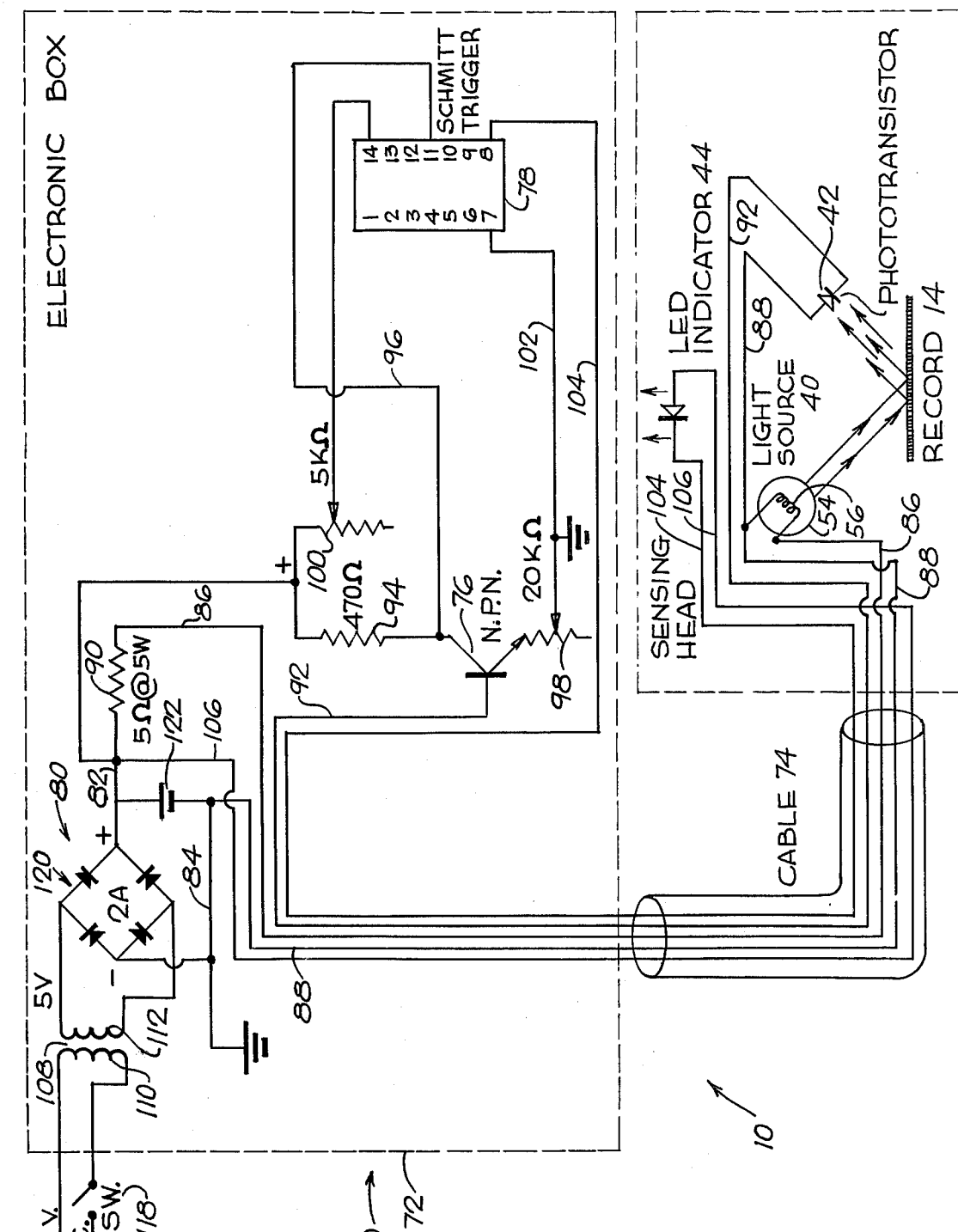

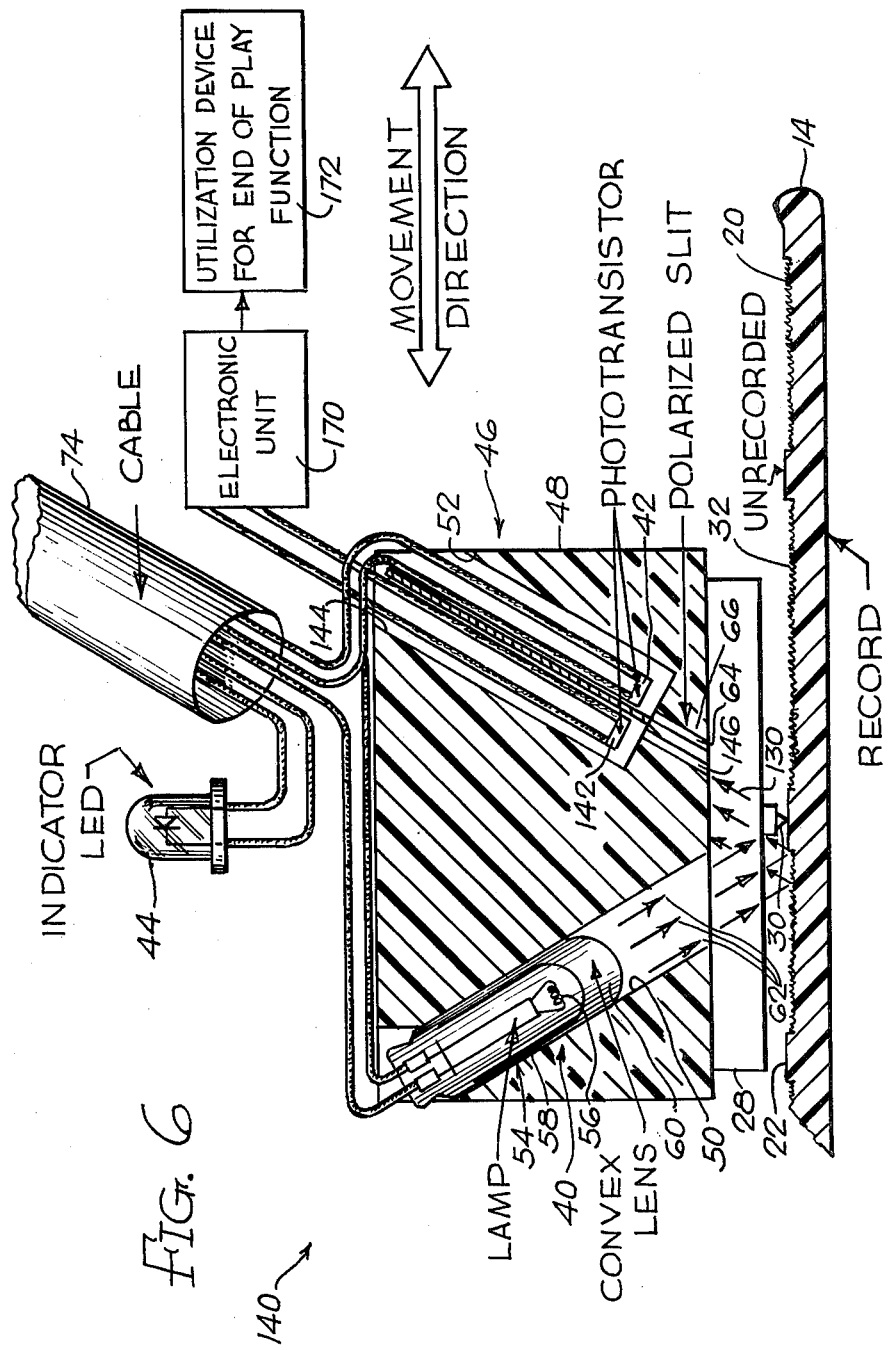

CUEING DEVICE FOR PHONOGRAPHS

This invention relates to a cueing device for a phonograph having a rotatable turntable or the like for supporting a grooved phonograph record having recorded zones alternating with unrecorded zones. The phonograph may have a movable pickup with a transducer thereon having a stylus for following the grooves of the record.

One principal object of the present invention is to provide a new and improved cueing device which will facilitate the operation of bringing the stylus into engagement with a selected unrecorded zone of the record, so that the next recorded zone will be played. In most phonographs, this operation is performed manually by the operator, but the operation may also be performed mechanically, under automatic control.

To achieve this object, the present invention preferably includes a light source mounted on the pickup for providing light on the face of the record adjacent the pickup, such light being reflected from the face of the record to a photoelectric device, also mounted on the pickup, for producing electrical signals corresponding to the reflected light. An electrically operable visual signal device is disposed in the neighborhood of the pickup for producing a visible signal. The visual signal device is operable by electrical operating means connected between the photoelectric device and the visual signal device, so that the visual signal device will be operated in response to the increased light reflected from the unrecorded zones of the record.

The visual signal device is preferably mounted on the pickup so that it will be clearly visible to the operator as the operator moves the pickup across the face of the record. In one preferred embodiment, the visual signal device takes the form of a light emitting diode mounted on the pickup and adapted to be energized when the light from the light source is reflected by an unrecorded zone of the record. The operator then can easily move the pickup so as to bring the stylus into engagement with the unrecorded zone, so that the phonograph will play the next recorded zone of the record.

For greatly increased reliability, the light source, the photoelectric device and the path of the light therebetween are preferably in a transverse perpendicular plane which is transverse to the grooves of the record and generally perpendicular to the face of the record. With this construction, the light reflected from the unrecorded zones of the record is given a polarization in a plane transverse to such transverse perpendicular plane. The pickup also preferably carries a polarized light transmitting device, interposed between the record and the photoelectric device, for favoring the transmission of the polarized light reflected by the unrecorded zones of the record. In this way, the contrast between the unrecorded zones and the recorded zones of the record is greatly increased, so that the photoelectric device produces a much more pronounced signal for each unrecorded zone. Thus, the operation of the light emitting diode, or any other utilization device, is made much more reliable.

The polarized light transmitting device may take the form of a slit, interposed between the record and the photoelectric device, and oriented with the longer dimension of the slit transverse to the transverse perpendicular plane of the light path. The slit is also generally parallel to a line tangent to the record groove engaged by the stylus.

The operator can easily perform the cueing operation by watching the light emitting diode or other visual signal device. When the stylus is over an unrecorded zone of the record, the light emitting diode will come on. The operator can then move the pickup toward the record so that the stylus will engage the unrecorded zone. In this way, the phonograph will play the next recorded zone. These cueing operations can also be performed mechanically, with the aid of an automatic control system triggered by the signals from the photoelectric device.

The cueing movement of the pickup, to bring the stylus into alignment with the desired unrecorded zone, is accomplished with the pickup lifted away from the record by a predetermined distance. The pickup may be lifted to its cueing height by operating a movable cueing lever or some other control member. At this cueing height, the light from the light source is reflected into the photoelectric device when an unrecorded zone is directly under the stylus. Thus, the photoelectric device produces a signal which causes the light emitting diode to be energized. As the operator lowers the pickup toward the record, the path of the reflected light from the unrecorded zone is moved laterally, away from the slit, so that the light received by the photoelectric device is decreased. The electrical signal produced by the photoelectric device is correspondingly decreased, with the result that the light emitting diode is de-energized. The de-energization of the light emitting diode is highly advantageous, because it provides a signal to the operator that the stylus is close to the record, so that the operator will know that the remainder of the lowering movement of the pickup should be accomplished slowly and gently, so that the stylus will be moved softly into engagement with the record.

In a modified embodiment, a second photoelectric device is provided on the pickup to produce a signal when the stylus is played to the end of each recorded zone. Such signal is produced by the light reflected to the second photoelectric device by the next unrecorded zone. The signals from the second photoelectric device may be employed to trigger an automatic control mechanism which may be employed to lift the pickup away from the record after a preselected number of recorded zones have been played. The unrecorded zones encountered by the pickup as the record is played cause the second photoelectric device to produce signals which can be counted and employed to trigger the control mechanism so that the pickup will be lifted away from the record and returned to its initial position.

Further objects, advantages and features of the present invention will appear from the following description, taken with the accompanying drawings, in which:

FIG. 1 is a general perspective view of a phonograph turntable unit, incorporating a cueing device to be described as an illustrative embodiment of the present invention.

FIG. 2 is an enlarged vertical section taken transversely through the pickup or tone arm of the phonograph, to show the elements of the cueing device which are mounted on the tone arm.

FIG. 3 is a schematic electrical circuit diagram of the cueing device.

FIG. 4 is a fragmentary section, taken generally along the line 4—4 in FIG. 2.

FIG. 6 is a view similar to FIG. 5, but showing a modified construction which includes a second photoelectric device.

Figure 5:
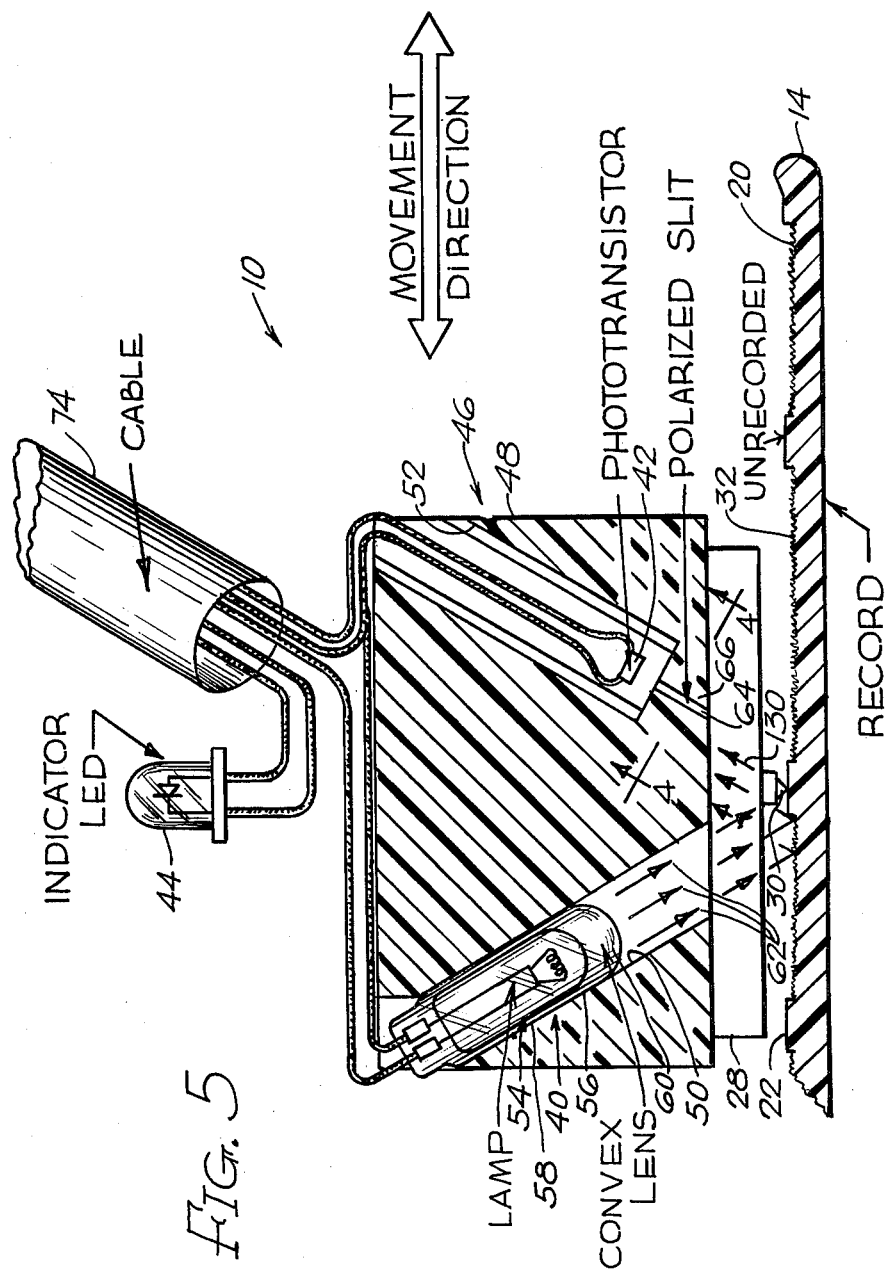
FIG. 5 is a view similar to FIG. 2, but showing the tone arm in its playing position, with the stylus in engagement with the record.

As just indicated, the drawings illustrate a cueing device 10 as applied to a phonograph turntable unit 12, which is illustrated as comprising means for movably supporting a phonograph record 14, such means being illustrated as a rotatable turntable 16 mounted on a base or cabinet 18. Suitable means, such as a motor and a drive train, not shown, may be provided within the base 18 to rotate the turntable 16.

While the present invention is applicable to all types of grooved phonograph records, the illustrated record 14 is of the disc type, having recorded zones 20 alternating with unrecorded zones 22. These zones 20 and 22 appear as circular bands or stripes on the face of the record 14. The unrecorded zones 22 are generally smooth, flat and mirror-like in appearance, while the recorded zones 22 have a grooved appearance because the successive record grooves are close together. Usually, the record 14 has a single spiral groove having a large number of turns which are closely spaced, or have a small pitch in the recorded zones 20, while having a considerably greater pitch in the unrecorded zones 22. Generally, the record 14 comprises a series of different musical selections on the successive recorded zones 20.

The phonograph unit 12 comprises means for playing the record so as to convert the recorded sections into electrical signals, such means being illustrated as a movable pickup 24. While the present invention is applicable to any suitable pickup, the illustrated pickup 24 comprises a swingable tone arm 26 which carries a transducer or cartridge 28 having a stylus 30 for following the grooves 32 of the record 14. The transducer 28 is mounted near the outer end of the tone arm 26. In accordance with the usual practice, the tone arm 26 is supported on the base 18 by pivot means 34, arranged so that the tone arm 26 can be swung toward and away from the record 14, and also along the face of the record. In this case, the tone arm 26 has a counterweight 36 for counterbalancing the weight of the tone arm so as to reduce the force between the stylus and the record 14. It will be understood that the vibrations imparted to the stylus 30 by the record grooves 32 are translated into electrical signals by the transducer 28. The electrical signals are amplified and reproduced as sound by one or more loudspeakers.

The illustrated phonograph unit 12 comprises movable cueing means, illustrated as a swingable lever 38, which may be operated to lift the tone arm 26 slightly, so that the stylus 30 will be raised above the face of the record 14, as shown in FIG. 2. The operator may then swing the tone arm 26 so that the stylus 30 is over a selected point on the record 14, whereupon the cueing lever 38 can be operated in the opposite direction to lower the stylus 30 into engagement with the record 14. In this way, a selected portion of the record 14 can be played. Generally, it is desired by the operator to bring the stylus into engagement with one of the unrecorded zones 22 of the record 14, so that the next recorded zone 20 will be played when the stylus 30 is brought into engagement with the record 14. It is difficult to locate the stylus 30 with complete accuracy over any selected unrecorded zone 22, because the zones are narrow and the stylus 30 is located on the underside of the tone arm 26 where the stylus is difficult to see. However, the cueing device 10 of the present invention greatly facilitates the cueing operation, so that the tone arm 26 can easily be positioned with the stylus 30 accurately aligned with any unrecorded zone 22.

The cueing device 10 comprises optical components on the tone arm 26 for accurately detecting when the tone arm is centered over one of the unrecorded zones 22. A signal is then produced to indicate that the tone arm is properly cued, so that the operator can lower the tone arm to bring the stylus 30 into engagement with the unrecorded zone 22.

Details of the optical components of the cueing device 10 are shown in FIGS. 2 and 4. It will be seen that the cueing device 10 comprises a light source 40 for directing light upon the face of the record 14. The light is reflected by the face of the record 14 to a photoelectric device 42 which produces electrical signals corresponding to the reflected light. These signals are employed to operate a visual signal device 44 disposed in the neighborhood of the tone arm 26, so that such signal device will immediately be noticed by the operator when the signal device is operated. It is preferred to mount the visual signal device 44 directly on the tone arm 26. In the illustrated embodiment, the visual signal device 44 takes the form of a light emitting diode (LED) mounted on the tone arm 26, so as to be clearly visible from above. The light emitting diode is highly advantageous, in that it is extremely small and light in weight, yet provides a clearly visible luminous signal, when energized. Other suitable light emitting devices may be employed, if desired.

The optical components of the cueing device 10 are shown in FIG. 2 as being incorporated into a sensing head 46, which may be incorporated into the tone arm 26 as original equipment, or may be clamped or otherwise mounted on an existing tone arm as an attachment. The optical components may also be incorporated individually into the tone arm 26.

As shown in FIG. 2, the sensing head 46 includes a mounting block 48 in which the light source 40 and the photoelectric device 42 are mounted. Thus, the light source 40 is mounted in an inclined bore or opening 50, formed in the mounting block 48. The photoelectric device 42 is mounted in a second inclined bore or opening 52.

Preferably, the light source 40 and the bore 50 are inclined at an angle to the face of the record 14. The light is reflected from the mirror-like unrecorded zones 22 at an oppositely inclined angle, toward the photoelectric device 42. The mounting bore 52 for the photoelectric device 42 is correspondingly angled.

The illustrated light source 40 comprises a miniature incadescent lamp 54 having a filament 56, mounted within a glass envelope or enclosure 58. A convex lens 60 is preferably provided to focus the light from the lamp 54 into a beam of substantially parallel light rays 62. The lens 60 may be incorporated into the glass envelope 58 of the lamp 54.

A slit 64 is preferably provided in front of the photoelectric device 42. The slit 64 may be formed in a wall portion 66 of the block 48. As shown in FIG. 2, the slit 64 is preferably inclined at an angle corresponding to the angle at which the light beam is reflected from the unrecorded zones 22 of the record 14. The width or shorter dimension of the slit is shown in FIG. 2. FIG. 4 is a cross-section taken through the slit 64, to show its longer dimension. As will be described in greater detail presently, the slit 64 acts as polarized light transmitting means.

It will be noted that the light source 40, the photoelectric device 42, and the path of the light therebetween are in a plane represented by the plane of the section shown in FIG. 2. Such plane is substantially perpendicular to the face of the record 14, and also transverse to the direction of the record grooves 32, where they are engaged by the stylus 30. Such plane is also transverse to the longitudinal dimension of the tone arm 26. The slit 64 is preferably oriented with its longer dimension substantially perpendicular or transverse to such plane, defined by the light path between the light source 40 and the photoelectric device 42. The longer dimension of the slit 64 is also parallel to the face of the record 14, and substantially parallel to a line which is tangent to the particular record groove engaged by the stylus 30.

The slit 64 increases the selectivity of the sensing head 46, so that there will be greater contrast between the light reflected to the photoelectric device 42 by the unrecorded zones 22 and the light reflected to the photoelectric device 42 by the recorded zones 20. To a considerable extent, this selectivity is due to the action of the slit 64 as a polarized light transmitting device. The reflection of the light beam from the unrecorded zones 22 of the record 14 imparts a considerable degree of polarization to the light beam, such polarization being in a direction perpendicular to the plane of the light beam. The slit 64 is oriented so as to favor the transmission of light which is polarized in this direction. Thus, a large signal is produced by the photoelectric device 42 in response to the light reflected from the unrecorded zones 22. On the other hand, the light reflected by the recorded zones 20 is diffused and largely random in its polarization. Thus, a great deal less light is transmitted through the slit 64 to the photoelectric device 42, when the light is reflected from the recorded zones 20 of the record 14.

The photoelectric device 42 produces electrical signals corresponding to the light received by the photoelectric device. It will be understood that the photoelectric device 42 may be of any known or suitable type. Preferably, the photoelectric device takes the form of a phototransistor, which has the advantage of being extremely small and highly sensitive.

The electrical signals from the photoelectric device 42 are employed to trigger the operation of a utilization device, in this case including the light emitting diode 44. The utilization device also includes operating means for energizing the light emitting diode 44, such operating means including an electronic unit 70, illustrated schematically in FIG. 3. The electronic unit 70 may be housed within the base 18, or in a separate electronic box 72, as shown in FIG. 1. Of course, the electronic unit 70 may also be housed within the cabinet of the radio receiver or amplifier with which the phonograph is used. A cable 74 may be provided to connect the sensing head or unit 46 to the electronic unit 70.

The electronic unit 70 of FIG. 3 comprises a transistor 76 for amplifying the signals from the photoelectric device 42, and a Schmitt trigger circuit 78 for operating the light emitting diode 44 in response to the output from the transistor 76. The Schmitt trigger circuit 78 may be in the form of an integrated circuit module.

The electronic unit 70 may be energized by a power supply 80, which may be contained within the electronic box 72. The power supply 80 provides direct current between positive and negative power supply output leads 82 and 84, the negative lead 84 being grounded.

In this case, the filament 56 of the lamp 54 in the light source 40 is also energized by the power supply 80. Thus, the filament 56 is connected to leads 86 and 88 in the cable 74. The lead 86 is connected to the positive power supply lead 82 through a series resistor 90 which reduces the current through the lamp filament 56. The lead 88 is connected to the negative supply lead 84, and thus also to ground.

In this case, one terminal of the phototransistor 42 is connected to the cable lead 88 and thus is connected to ground. The other terminal of the phototransistor 42 is connected by means of a cable lead 92 to the base of the transistor 76.

As shown in FIG. 3, the collector of the transistor 76 is connected through a load resistor 94 to the positive power supply lead 82. The collector is also connected by a lead 96 to the input terminal of the Schmitt trigger circuit 78. A variable resistor 98 is connected between the emitter of the transistor 76 and ground.

The positive power supply terminal of the Schmitt trigger 78 is connected through a series variable resistor 100 to the positive power supply lead 82. By means of a lead 102, the negative power supply terminal of the Schmitt trigger 78 is grounded.

The light emitting diode 44 is connected by means of cable leads 104 and 106 between the output terminal of the Schmitt trigger circuit 78 and the positive power supply lead 82.

The power supply 80 may be of any known or suitable construction. As shown, the power supply 80 comprises a transformer 108 having primary and secondary windings 110 and 112, the primary winding 110 being adapted to be connected to alternating current supply lines 114 and 116, which may be adapted to supply the usual 110 volts at 60 Hz, or any other desired voltage and frequency. In this case, a power supply switch 118 is connected in series with one of the supply lines 116.

The secondary winding 112 of the transformer 108 preferably delivers a relatively low voltage, such as 5 volts, for example. In this case, a full wave bridge rectifier 120 is connected between the secondary winding 112 and the power supply output leads 82 and 84. A filter capacitor 122 is connected between the positive and negative leads 82 and 84.

The photoelectric device 42 provides a signal which varies in accordance with the amount of light supplied to the photoelectric device. This signal is amplified by the transistor, which provides an amplified variable output signal which is supplied to the Schmitt trigger circuit 78. The transistor 76 amplifies the input signal to a level compatible with the Schmitt trigger gate.

The Schmitt trigger circuit converts the analog or varying output signal from the transistor 76 into a digital output signal having two alternate states, high or low. The Schmitt trigger circuit 78 has input signal threshold levels at which the output signal switches between its two states. When the signal from the transistor 76 rises to the first threshold level, the Schmitt trigger circuit switches to its high state, so as to energize the light emitting diode 44. When the signal from the transistor 76 drops below the second threshold, which is lower than the first threshold, the Schmitt trigger circuit 78 switches to its low state, so as to de-energize the light emitting diode 44.

It may be helpful to summarize the operation of the cueing device 10 of FIGS. 1–4. When the tone arm 26 is to be cued, the tone arm is raised above the record 14 to its cueing height. This is usually done by operating the cueing lever 38. The tone arm 26 can then be moved along the face of the record 14, while the cueing height of the tone arm is maintained.

The object of the cueing operation is to move the tone arm 26 into a position in which the stylus 30 is immediately above one of the unrecorded zones 22 on the record, such unrecorded zone having been selected because of a desire to play the musical selection which is recorded on the next recorded zone 20.

The cueing device 10 provides a visible signal which indicates that the tone arm 26 is centered over one of the unrecorded zones 22. The light source 40 in the sensing head 46 directs a beam of parallel light rays 62 upon the face of the record 14. The light from the lamp 54 is focused into the parallel beam by the convex lens 60.

When the light beam falls upon one of the recorded zones 22, the light rays are diffused so that very little light is directed through the slit 64 to the photoelectric device 42. Accordingly, the photoelectric device 42 produces only a small signal, which is insufficient to cause the energization of the light emitting diode 44.

When the sensing head 46 is centered over one of the unrecorded zones 22, the light beam is reflected by the unrecorded zone, directly toward the photoelectric device 42, so that a maximum amount of light passes through the slit 64 to the photoelectric device 42. Due to the smooth, mirror-like finish of the unrecorded zones 22, they provide specular reflection, so that the angle of reflection is equal and opposite to the angle of incidence. Thus, the reflected light rays are aimed so that they can pass directly through the slit 64. Moreover, the specular reflection imparts a considerable degree of polarization to the light beam. Such polarization is in a direction which is parallel to the longer dimension of the slit 64, so that the slit favors the transmission of the polarized light.

The greatly increased light on the photoelectric device 42 causes the photoelectric device to produce a correspondingly increased electrical signal, which is amplified by the transistor 76 in the electronic unit 70 of FIG. 3. The output of the transistor 76 is sufficient to cause the Schmitt trigger circuit 78 to switch to its high state, so that the light emitting diode 44 is energized. The diode provides a readily visible signal to the operator, so that the operator knows that the stylus 30 is cued over one of the unrecorded zones 22. In this way, the operator can easily and quickly cue the stylus over any selected unrecorded zone. The operator can then use the cueing lever 38 to lower the tone arm 26 toward the record 14, so as to bring the stylus 30 into engagement with the unrecorded zone. The stylus is picked up by the record groove, so that the next recorded zone 20 is played.

As the tone arm 26 is lowered from its cueing height toward the record 14, the reflected light beam 130 is shifted laterally, relative to the slit 64 and the photoelectric device 42, as shown in FIG. 5, because of the angularity of the light beam and the decreased distance between the sensing head 46 and the record 14. The light beam 130 is shifted sufficiently to be moved away from the slit 64, so that the light reaching the photoelectric device 42 is greatly reduced. The corresponding reduction in the signal from the photoelectric device 42 causes the output of the transistor 76 to be reduced to such an extent that the Schmitt trigger circuit 78 switches to its low state. As a result, the light diode 44 is de-energized. This provides a signal to the operator that the stylus 30 is close to the face of the record 14, so that the operator knows that the remainder of the lowering movement of the tone arm 26 should be carried out very slowly and gently, so that the stylus 30 will be moved softly into engagement with the record 14.

In the embodiments of FIGS. 1 - 5, the cueing device 10 operates a visual signal device, in the form of the light emitting diode 44, to provide visible cueing signals to the operator. However, the cueing device may be arranged to provide other types of signals, such as audible signals. Moreover, the cueing device may be incorporated into an automatic control system, adapted to cue the tone arm 26 under electromechanical control. Such control system may utilize any known or suitable means for manipulating the tone arm 26. The cueing operation can be accomplished automatically by supporting the tone arm 26 at its cueing height, while swinging the tone arm across the face of the record 14, while utilizing the cueing device to provide cueing signals when the unrecorded zones 22 are directly under the tone arm. The automatic control mechanism may be arranged to count the cueing signals and to stop the tone arm over one of the unrecorded zones when the desired count has been reached. The tone arm may then be lowered by the control mechanism so that the stylus 30 will engage the record 14.

FIG. 6 shows a modified cueing device 140 which includes a second photoelectric device 142 to provide a second electrical signal, indicating that the tone arm 26 has completed the playing of one of the recorded zones 20, and has reached the unrecorded zone 22 at the end of the recorded zone.

The cueing device 140 of FIG. 6 includes all of the elements of the cueing device 10, plus the second photoelectric device 142, which is similar to the first photoelectric device 42 but is located closer to the light source 40. As shown, the photoelectric device 142 is mounted in a bore or opening 144, formed in the block or body 48 of the sensing head 46. A second slit 146 is formed in the wall portion 66 to transmit the reflected light beam to the second photoelectric device 142. The bore 144 and the slit 146 for the second photoelectric device 142 are angled and oriented the same as the bore 52 and the slit 64 for the first photoelectric device 42. Thus, the bore 144 and the slit 146 are parallel to the bore 52 and the slit 64, respectively.

The second photoelectric device 142 may be connected to its own electronic circuit 170, which may be similar to the electronic circuit 70 of FIG. 3. A second utilization device 172 may be connected to the output of the electronic circuit 170 for the second photoelectric device 142. Such utilization device may provide a signal for the operator, or may be incorporated into an automatic control system for manipulating the tone arm 26 or changing the record 14, or both.

When the stylus 30 engages the record 14, the stylus follows the record groove through each recorded zone 20 and then reaches the following unrecorded zone 22. Simultaneously, the light beam from the light source 40 is reflected from the unrecorded zone 22 into the slit 146, which transmits the light beam to the photoelectric device 142. The resulting electrical signal from the photoelectric device 142 is amplified by the electronic unit 170 and employed to operate the utilization device 172. The utilization device 172 and the associated automatic control system may be programmed to count the unrecorded zones and to lift the tone arm 26 from the record 14 after the preselected count has been reached. Thus, one or more successive recorded zones 20 may be played before the tone arm 26 is lifted from the record 14. In the automatic control system, the first photoelectric device 42 may be employed to cue the tone arm 26, the same as described previously in connection with FIGS. 1–5.

Thus, each of the photoelectric devices 42 and 142 produces signals to trigger the operation of a utilization device which performs at least one control function. In the embodiment of FIG. 6, the first photoelectric device 42 controls the cueing function, while the second photoelectric device 142 controls the end of play function. The utilization devices controlled by both first and second photoelectric devices may function independently, or may be coordinated as components of a unified automatic control system.

We claim:

1. A cueing device for a phonograph having a rotatable turntable for supporting a grooved phonograph record having recorded zones alternating with unrecorded zones,
    said cueing device comprising a movable tone arm having a transducer thereon with a stylus for following the grooves of the record,
    a light source mounted on said tone arm for providing light on the face of the record adjacent said tone arm,
    said light being reflected from the face of the record,
    a photoelectric device mounted on said tone arm for receiving such light after being reflected from the face of the record and for producing electrical signals corresponding to the reflected light,
    an electrically operable visual signal device mounted on said tone arm for producing a visible signal for the operator of the tone arm,
    and electrical operating means connected between said photoelectric device and said visual signal device for operating said visual signal device in response to the increased light reflected from the unrecorded zones of the record,
    said tone arm having an outer end portion,
    said transducer and said visual signal device being mounted on said outer end portion of said tone arm whereby said visual signal device and the position of said transducer can be closely watched simultaneously by the operator.

2. A cueing device according to claim 1,
    in which said visual signal device comprises a light emitting device.

3. A cueing device according to claim 1,
    in which said visual signal device comprises a light emitting diode.

4. A cueing device for a phonograph having a rotatable turntable for supporting a grooved phonograph record having recorded zones alternating with unrecorded zones,
    said cueing device comprising a tone arm having a transducer thereon with a stylus for following the grooves of the record,
    pivot means supporting said tone arm for swinging movement toward and away from the record and also for swinging movement along the face of the record,
    said stylus being disposed in a tangential perpendicular plane which is generally tangential to the grooves of the record and generally perpendicular to the face of the record,
    a light source mounted on said tone arm for directing light at an inclined angle upon the face of the record adjacent said tone arm,
    said light being reflected at an oppositely inclined angle from the face of the record,
    a photoelectric device mounted on said tone arm for receiving such light after being reflected from the face of the record and for producing electrical signals corresponding to the reflected light,
    said light source, said photoelectric device and the path of the light therebetween being in a transverse generally perpendicular plane which is transverse to said tangential perpendicular plane and also transverse to the grooves of the record,
    a polarized light transmitting device disposed in the path of the light between the face of the record and said photoelectric device,
    said polarized light transmitting device being oriented to favor the transmission of light polarized in a plane transverse to said transverse generally perpendicular plane of the light path,
    and utilization means connected to said photoelectric device for performing at least one control function in response to the changing signals from said photoelectric device produced by the transitions between the recorded and the unrecorded zones of the record.

5. A cueing device according to claim 4,
    in which said polarized light transmitting device comprises means forming a slit interposed between the record and said photoelectric device,
    said slit having its longer dimension oriented transversely to said transverse generally perpendicular plane of the light path.

6. A cueing device according to claim 5,
    in which said light source includes means for directing a beam of parallel light rays upon the face of the record adjacent said tone arm,
    the reflection of said beam from the unrecorded zones of the record being effective to cause polarization of the reflected light.

7. A cueing device according to claim 4,
    in which said light source comprises means for directing a parallel beam of light upon the face of the record adjacent said tone arm,
    the reflection of said beam from the unrecorded zones of the record being effective to cause polarization of the reflected light 8. A cueing device according to claim 4,
    in which said utilization means includes visual signal means disposed in the neighborhood of said tone arm and operable in response to the increased light reflected by the unrecorded zones of the record.

9. A cueing device according to claim 4,
    in which said utilization means includes a visual signal device mounted on said tone arm and operable in response to the increased light reflected by the unrecorded zones of the record.

10. A cueing device according to claim 9,
    in which said visual signal device comprises a light emitting device.

11. A device according to claim 9,
    in which said visual signal device comprises a light emitting diode.

12. A cueing device for a phonograph having a rotatable turn table for supporting a grooved phonograph record having recorded zones alternating with unrecorded zones,
  said cueing device comprising a movable pickup having a transducer thereon with a stylus for following the grooves of the record,
  a light source mounted on said pickup for directing light at an inclined angle upon the face of the record adjacent said pickup,
  said light being reflected at an oppositely inclined angle from the face of the record,
  a photoelectric device mounted on said pickup for receiving such light after being reflected from the face of the record and for producing electrical signals corresponding to the reflected light,
  said light source, said photoelectric device and the path of the light therebetween being in a transverse generally perpendicular plane which is transverse to the grooves of the record and generally perpendicular to the face of the record,
  a polarized light transmitting device disposed in the path of the light between the face of the record and said photoelectric device,
  said polarized light transmitting device being oriented to favor the transmission of light polarized in a plane of the light path,
  and utilization means connected to said photoelectric device for performing at least one control function in response to the changing signals from said photoelectric device produced by the transitions between the recorded and the unrecorded zones of the record.

13. A cueing device according to claim 12,
  in which said polarized light transmitting device comprises means on said pickup and forming a slit interposed between the record and said photoelectric device,
  said slit having its longer dimension oriented transversely to said transverse generally perpendicular plane of the light path.

14. A cueing device for a phonograph having a rotatable turntable for supporting a grooved phonograph record having recorded zones alternating with unrecorded zones,
  said cueing device comprising a movable pickup having a transducer thereon with a stylus for following the grooves of the record,
  a light source mounted on said pickup for directing light at an inclined angle upon the face of the record adjacent the pickup,
  said light being reflected at an oppositely inclined angle from the face of the record,
  a photoelectric device mounted on said pickup for receiving such light after being reflected from the face of the record and for producing electrical signals corresponding to the reflected light,
  said light source, said photoelectric device and the path of the light therebetween being in a transverse generally perpendicular plane which is transverse to the grooves of the record and generally perpendicular to the face of the record,
  means on said pickup forming a slit interposed between the record and said photoelectric device,
  said slit having its longer dimension oriented transversely to said transverse generally perpendicular plane of the light path,
  and utilization means connected to said photoelectric device for performing at least one control function in response to the changing signals from said photoelectric device produced by the transitions between the recorded and the unrecorded zones of the record.

15. A cueing device according to claim 14, in which said utilization means includes a visual signal device disposed in the neighborhood of said pickup for producing a visible signal in response to said transitions.

16. A cueing device according to claim 14,
  in which said utilization means comprises a light emitting device mounted on said pickup and operable in response to said transitions.

17. A cueing device according to claim 14,
  in which said utilization means includes a light emitting diode mounted on said pickup and operable in response to such transitions.

18. A cueing device according to claim 14,
  including means for forming the light from said light source into a beam for illuminating a defined illuminated area on the face of the record,
  said slit and said photoelectric device being aimed at said illuminated area when said stylus is spaced at a predetermined distance from the face of the record for cueing,
  said illuminated area being shifted laterally along the surface of the record when said pickup is moved toward the record to bring said stylus close to the record so that said slit and said photoelectric device are aimed at a portion of the record outside said illuminated area,
  whereby said photoelectric device no longer receives reflected light from said beam with the result that said utilization means is no longer operated.

19. A cueing device for a phonograph having a rotatable turntable for supporting a grooved phonograph record having recorded zones alternating with unrecorded zones,
  said cueing device comprising a movable pickup having a transducer thereon with a stylus for following the grooves of the record,
  a light source mounted on said pickup for directing light at an inclined angle upon the face of the record adjacent said pickup,
  said light being reflected at an oppositely inclined angle from the face of the record,
  a first photoelectric device mounted on said pickup for receiving such light after being reflected from the face of the record and for producing a first electrical signal corresponding to the reflected light,
  first utilization means connected to said first photoelectric device for performing a cueing function in response to changes in the signal from said first photoelectric device,
  a second photoelectric device mounted on said pickup for receiving the reflected light from the face of the record and for producing a second electrical signal corresponding to the reflected light,
  said second photoelectric device being closer to said light source than said first photoelectric device,
  and second utilization means connected to said second photoelectric device for performing an end of play function in response to changes in the signal from said second photoelectric device.

20. A cueing device according to claim 19,
  comprising means aiming said first and second photoelectric devices in parallel directions on said pickup.

21. A cueing device according to claim 19, including means aiming said first and second photoelectric devices in parallel inclined directions on said pickup, said light source, said first photoelectric device, said second photoelectric device and the light paths between said light source and said first and second photoelectric devices being in a common plane.

22. A cueing device according to claim 21, in which said common plane is generally perpendicular to the face of the record and transverse to the record groove where it is engaged by the stylus.

23. A cueing device for a phonograph having a rotatable turntable for supporting a grooved phonograph record having recorded zones alternating with unrecorded zones, said cueing device comprising a movable pickup having a transducer thereon with a stylus for following the grooves of the record, a light source mounted on said pickup for directing light at an inclined angle upon the face of the record adjacent the pickup, said light being reflected at an oppositely inclined angle from the unrecorded zones of the record and to a lesser extent from the recorded zones, a first photoelectric device mounted on said pickup for receiving such light after being reflected from the face of the record and for producing a first electrical signal corresponding to the reflected light, said light source, said first photoelectric device and the path of the light therebetween being in a transverse generally perpendicular plane which is transverse to the grooves of the record where engaged by the stylus and generally perpendicular to the face of the record, a first utilization device connected to said first photoelectric device for performing the cueing function, a second photoelectric device mounted on said pickup for receiving reflected light from the face of the record and for producing a second electrical signal corresponding to the reflected light, and a second utilization device connected to said second photoelectric device for performing an end of play function in response to the electrical signals from said second photoelectric device, said first and second photoelectric devices being aimed in generally parallel inclined directions, said second photoelectric device being disposed substantially in said transverse generally perpendicular plane, said second photoelectric device being closer than said first photoelectric device to said light source and being operative to receive reflected light from each unrecorded zone as the stylus completes the play of the preceding recorded zone, said first photoelectric device being operative to receive reflected light from each unrecorded zone when the stylus is opposite such zone and spaced therefrom at a cueing distance.

* * * * *

UNITED STATES PATENT OFFICE
CERTIFICATE OF CORRECTION

Patent No. 4,079,944          Dated March 21, 1978

Inventor(s) Benton A. Durley, III and Hari Matsuda

It is certified that error appears in the above-identified patent and that said Letters Patent are hereby corrected as shown below:

Column 8, line 1, after "light" insert --emitting--

Column 10, line 50, at the end of the line insert a period (.)

Column 11, line 25, after "plane" insert --transverse to said transverse generally perpendicular plane--

Signed and Sealed this

Nineteenth Day of September 1978

[SEAL]

Attest:

RUTH C. MASON
Attesting Officer

DONALD W. BANNER
Commissioner of Patents and Trademarks